Sept. 24, 1968   K. TRACHTE ET AL   3,402,783
WHEEL SUSPENSION
Filed Nov. 5, 1965

INVENTORS
KURT TRACHTE
KURT ENKE

BY  *Dicker & Craig*
ATTORNEYS

United States Patent Office 3,402,783
Patented Sept. 24, 1968

3,402,783
WHEEL SUSPENSION
Kurt Trachte, Echterdingen, Wurttemberg, and Kurt Enke, Fellbach, Wurttemberg, Germany, assignors to Daimler-Benz Aktiengesellschaft, Stuttgart-Unterturkheim, Germany
Filed Nov. 5, 1965, Ser. No. 506,461
Claims priority, application Germany, Nov. 7, 1964, D 45,806
17 Claims. (Cl. 180—73)

ABSTRACT OF THE DISCLOSURE

A suspension of the driven wheels, especially of the rear wheels of a motor vehicle which includes an axle gear housing that is pivotally suspended at the vehicle superstructure about a cross axis and which is so supported on a part of the spring system of the wheels partaking in the spring deflections of the wheels that the reaction moment occurring during the drive of the wheels at the axle gear housing produces a torque directed opposite to the pitching moment of the vehicle superstructure during starting and/or accelerations; in particular, the axle gear housing may be supported on a cranked portion of a transversely extending stabilizer which forms a part of the vehicle spring system.

---

The present invention relates to a suspension of driven wheels, especially of the rear wheels of a motor vehicle, having an axle gear housing which is pivotally suspended at the vehicle superstructure about a cross axis and which is supported on a part partaking in the spring movements of the wheels of the type described in the co-pending application Ser. No. 497,860, filed Oct. 19, 1965, and assigned to the assignee of the present application.

The softer the vehicle spring system, for example, with a pneumatic or hydropneumatic spring system, the more strongly noticeable becomes the so-called pitching or nodding of the vehicle rear part during starting or sudden accelerations. There is achieved by the arrangement according to the aforementioned co-pending application that the drive reaction moment occurring at the axle gear housing is so transmitted to the parts participating in the spring movements of the wheels, for example, to the inclined guide members that it counteracts the pitching or nodding moment produced by the mass inertia of the vehicle.

The present invention provides a further development of and improvement in such a wheel suspension and essentially consists in that an axle gear housing pivotally suspended at the vehicle superstructure about a horizontal cross axis is so supported on the spring system of the wheels, especially on a stabilizer that the reaction moment occurring during drive of the wheels at the axle gear housing produces a torque on the spring system or stabilizer which is directed opposite the pitching moment of the vehicle superstructure during starting or accelerations.

Such an arrangement offers the advantage that practically no additional structure elements are necessary in order to decrease the pitching motion during starting, especially when a stabilizer is already required at any rate as is always necessary as a rule with soft spring systems. By a corresponding arrangement of the pivot bearings of the axle gear housing as well as of the lever arms, by means of which the axle gear housing acts on the spring system or on the stabilizer forming part of the spring system, the pitching or nodding during starting of the rear part of the motor vehicle can be more or less completely compensated.

For purposes of supporting the axle gear housing on a transversely disposed torsion rod, for example, clamped or secured within its central part and constructed as stabilizer or on any other transversely arranged torsion spring, the torsion spring at the central clamping place thereof or the stabilizer in the central part thereof may be provided with a lever arm, preferably in the form of a cranked portion with torsion rods. Depending on the arrangement of the spring element supporting the axle gear housing and on the arrangement of the stabilizer, it is appropriate to pivotally support the axle gear housing to the rear or in front of the wheel center axis at the vehicle superstructure.

Accordingly, it is an object of the present invention to provide a wheel suspension of the type described above which eliminates, by extremely simple means and in an extraordinarily effective manner, the drawbacks and shortcomings encountered with the prior art wheel suspensions.

Another object of the present invention resides in the provision of a wheel suspension which permits, by simple means, and without the need for additional structural parts, to compensate more or less completely the forces otherwise causing the pitching movements of the vehicle rear part during starting and sudden accelerations, especially with the use of soft spring systems.

A further object of the present invention resides in a wheel suspension in which the axle gear housing is so connected with parts of the wheel suspension, particularly with a stabilizer, that forces are caused to act on the wheel suspension which effectively counteract the mass inertia forces normally causing a pitching of the rear part of the vehicle during starting and accelerations.

These and further objects, features, and advantages of the present invention will become more obvious from the following description when taken in connection with the accompanying drawing, which shows, for purposes of illustration only, several embodiments in accordance with the present invention, and wherein.

Figure 1:
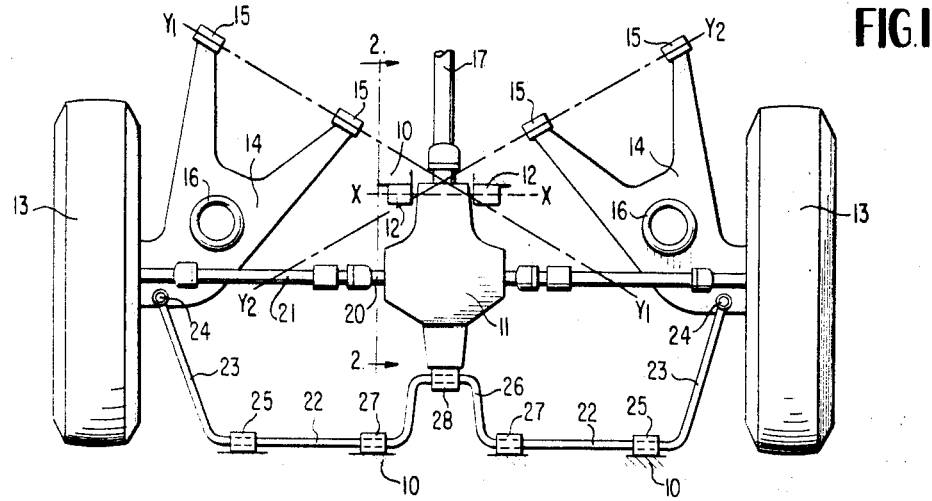
FIGURE 1 is a schematic plan view on a rear axle having a stabilizer arranged behind the rear axle and including an anti-pitch equalizing arrangement according to the present invention.

Referring now to the drawing wherein like reference numerals are used throughout the various views to designate corresponding parts, reference numeral 10 designates in all figures the vehicle superstructure which may be of any conventional construction, i.e., may be constituted by a frame member, a part of a self-supporting-type body construuction or the like. The housing 11 of the rear axle gear is pivotally suspended at the vehicle superstructure 10 about a cross axis $x$—$x$ in two bearings 12 of conventional construction, for example, by the interposition of conventional rubber sleeves or bushings. The inclined guide members 14, which support the rear wheels 13 of the motor vehicle, are also supported at the vehicle superstructure in that they are able to pivot about the axes $y_1$—$y_1$ and $y_2$—$y_2$ disposed at an inclination to the driving direction in bearings 15 of conventional construction, preferably also by the interposition of conventional rubber bushings. The inclined guide members 14 are spring-supported against the vehicle superstructure 10 by means of springs 16, for example, pneumatic or hydropneumatic springs of any known construction.

The drive of the wheels takes place, for example from a forwardly disposed engine (not shown) by way of a Cardan shaft 17, the axle gear arranged within the axle gear housing 11 including the usual bevel gear pinion 18 and the drive bevel wheel 19, the axle gear shafts 20 and the joint shafts 21 which, constructed as double joint shafts, are connected on the one hand by a joint with the axle shafts 20 and on the other hand by a second joint with the wheels 13 supported on the inclined guide members 14.

In order to counteract the curve tilting of the vehicle, a stabilizer 22 in the form of a torsion rod is provided whose cranked ends 23 near the wheels 13 are pivotally connected with the wheel carrier or with the inclined guide members 14 and which are supported at the vehicle superstructure 10 within bearings 25 in proximity of a respective cranked portion 23. According to the present invention, the axle gear housing 11, pivotal about a horizontal cross axis $x-x$, is supported on the stabilizer 22. For this purpose, the stabilizer 22 is provided within its central region with a cranked portion 26 and is additionally supported at the vehicle superstructure 10 or at a part connected with the vehicle superstructure on both sides of the cranked portion 26 in two further bearings 27. The axle gear housing 11 is supported on the cranked portion 26 by means of a conventional bearing eye 28.

With the construction according to FIGURE 1, the stabilizer 22 is arranged behind the rear axle, i.e., to the rear of the center axes of the wheels 13, whereby the cranked portions 23 and 26 are all directed forwardly. The axle gear housing 11 is supported in front of the wheel centers within the horizontal pivot axis $x-x$.

If the vehicle starts or is otherwise suddenly accelerated, the mass acting through the center of gravity of the vehicle effects by reason of its inertia a torque that seeks to press the rear part of the vehicle against the ground. On the other hand, forces P occur within the bearings of the pinion 18 and of the drive bevel gear 19 or of the differential gear which forces produce a torque that causes, in relation to FIGURE 2, a torque in the direction of arrow $a$ and therewith forces Q in the bearing 12 as well as in the pivot eye 28 at the central cranked portion 26 of the stabilizer 22. This force Q at the bearing eye 28 seeks to rotate the stabilizer 22 in the direction of arrow $b$ and therewith seeks to act on the wheels 13 with a force causing the same to move away from the vehicle superstructure 10. Depending on the dimension of the lever arms by means of which the forces P and Q act on the axle gear housing 11 and on the stabilizer 22, the pitching during starting or accelerations by the vehicle rear part can be more or less counteracted.

Figure 3:
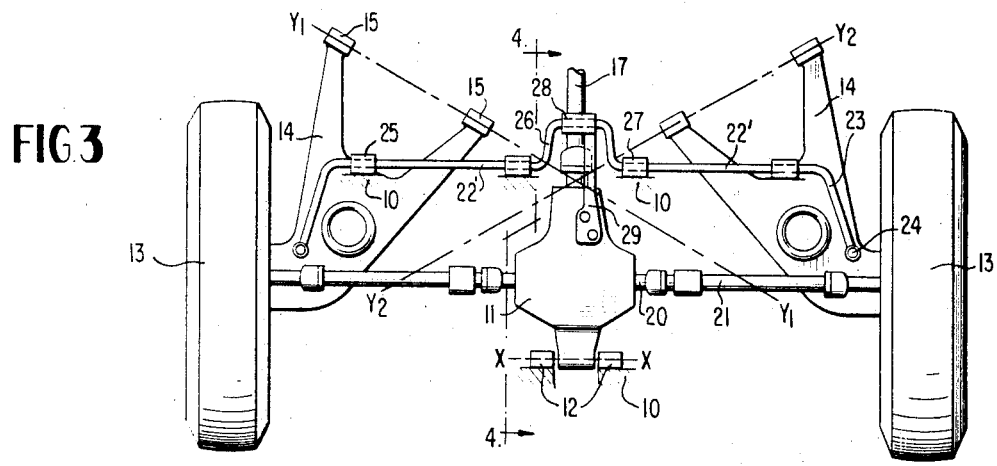
FIGURE 3 is a schematic plan view, similar to FIGURE 1, on a modified construction of a wheel suspension for a rear axle in accordance with the present invention having a stabilizer arranged in front thereof.
Figure 2:
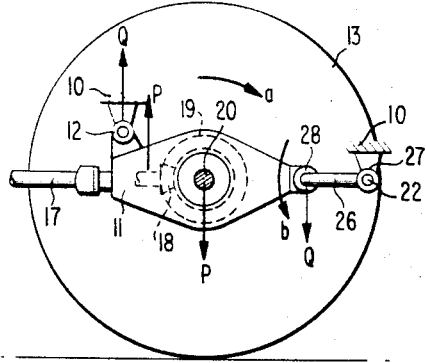
FIGURE 2 is a cross-sectional view, taken along line 2—2 of FIGURE 1.
Figure 4:
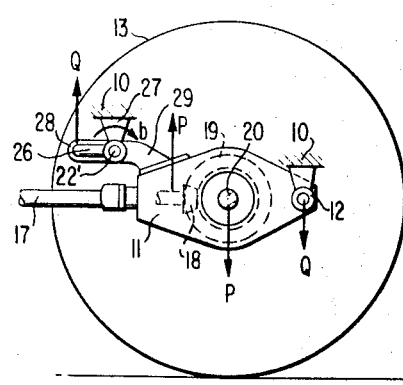
FIGURE 4 is a cross-sectional view, taken along line 4—4 of FIGURE 3.

The embodiment according to FIGURES 3 and 4 differs from the embodiment of FIGURES 1 and 2 only by the fact that the stabilizer 22' is arranged in front of the wheel centers and is provided with a forwardly directed cranked portion 26 which is directed away from the wheel centers.

The axle gear housing 11 is pivotally suspended to the rear of the wheel centers in the horizontal pivot axis $x-x$ and is provided with a forwardly directed arm 29 that is supported in the bearing eye 28 on the cranked portion 26 of the stabilizer 22'. As to the rest, the operation is analogously the same as with the first embodiment.

While we have shown and described two embodiments in accordance with the present invention, it is understood that the same is not limited thereto but is susceptible of numerous changes and modifications as known to a person skilled in the art and we, therefore, do not wish to be limited to the details shown and described herein but intend to cover all such changes and modifications as are encompassed by the scope of the appended claims.

We claim:
1. A wheel suspension for the driven wheels, especially the rear wheels of a motor vehicle having a vehicle superstructure and an axle gear housing, comprising:
   first means for pivotally suspending said axle gear housing at said vehicle superstructure about a substantially transverse axis,
   second means including guide means and spring means for suspending the wheels at said vehicle superstructure,
   and third means operatively connecting said axle gear housing with a part of the wheel suspension means participating in the spring movements of the wheels including support means supporting said axle gear housing on said spring means to produce by the reaction moment occurring during the drive of the wheels at the axle gear housing a torque directed opposite to the pitching moment of the vehicle superstructure during starting and accelerations of the vehicle.

2. A suspension according to claim 1, wherein said spring means is constituted by a transversely disposed torsion rod having within the central portion thereof a lever arm for the support of the axle gear housing.

3. A suspension according to claim 2, wherein said torsion rod is supported at the vehicle superstructure both in proximity of the wheels as well as adjacent the central lever arm.

4. A suspension according to claim 3, wherein said axle gear housing is pivotally suspended by said first means in front of the wheel centers at the vehicle superstructure about a substantially horizontal cross axis and is supported on the spring means to the rear of the wheel centers.

5. A suspension according to claim 3, wherein said axle gear housing is pivotally suspended by said first means to the rear of the wheel centers at the vehicle superstructure about a substantially horizontal cross axis and is supported on said spring means in front of the wheel centers.

6. A suspension according to claim 1, wherein said axle gear housing is pivotally suspended by said first means in front of the wheel centers at the vehicle superstructure about a substantially horizontal cross axis and is supported on the spring means to the rear of the wheel centers.

7. A suspension according to claim 1, wherein said axle gear housing is pivotally suspended by said first means to the rear of the wheel centers at the vehicle superstructure about a substantially horizontal cross axis and is supported on said spring means in front of the wheel centers.

8. A wheel suspension for the driven wheels, especially the rear wheels of a motor vehicle having a vehicle superstructure and an axle gear including a housing, comprising:
   first means for pivotally suspending said axle gear housing at said vehicle superstructure about a substantially transverse axis,
   second means including guide means and spring means for suspending the wheels at said vehicle superstructure,
   said spring means including a stabilizer,
   and third means operatively connecting said axle gear housing with a part of the wheel suspension means participating in the spring movements of the wheels including support means supporting said axle gear housing on said stabilizer to produce by the reaction moment occurring during the drive of the wheels at the axle gear housing a torque directed opposite to the pitching moment of the vehicle superstructure during starting and accelerations of the vehicle.

9. A suspension according to claim 8, wherein said stabilizer is constituted by a substantially transversely disposed torsion rod having within the central portion thereof a lever arm in the form of a cranked portion for the support of the axle gear housing.

10. A suspension according to claim 9, wherein said torsion rod is supported at the vehicle superstructure both in proximity of the wheels as well as adjacent the central lever arm.

11. A suspension according to claim 10, wherein said axle gear housing is pivotally suspended by said first means in front of the wheel center at the vehicle superstructure about a substantially horizontal cross axis and is supported on the stabilizer to the rear of the wheel centers.

12. A suspension according to claim 10, wherein said axle gear housing is pivotally suspended by said first means to the rear of the wheel centers at the vehicle superstructure about a substantially horizontal cross axis and is supported on said stabilizer in front of the wheel centers.

13. A suspension according to claim 8, wherein said axle gear housing is pivotally suspended by said first means in front of the wheel center at the vehicle superstructure about a substantially horizontal cross axis and is supported on the stabilizer to the rear of the wheel centers.

14. A suspension according to claim 8, wherein said axle gear housing is pivotally suspended by said first means to the rear of the wheel centers at the vehicle superstructure about a substantially horizontal cross axis and is supported on said stabilizer in front of the wheel centers.

15. A suspension according to claim 8, wherein said stabilizer is provided with a forwardly directed cranked portion for the support of the axle gear housing.

16. A suspension according to claim 15, wherein said stabilizer is disposed forwardly of the wheel axes of the driven wheels.

17. A suspension according to claim 15, wherein said stabilizer is disposed rearwardly of the wheel axes of the driven wheels.

References Cited

UNITED STATES PATENTS 3,147,815  9/1964  Arkus-Duntov et al. __ 180—73

A. HARRY LEVY, *Primary Examiner.*